United States Patent
Jacobsen et al.

(10) Patent No.: US 7,604,204 B2
(45) Date of Patent: Oct. 20, 2009

(54) LOADING DEVICE FOR THE AT LEAST PARTIALLY AUTOMATED LOADING AND UNLOADING OF A CARGO HOLD ON TRANSPORT EQUIPMENT AS WELL AS A CONVEYING SYSTEM

(75) Inventors: Ruediger Jacobsen, Weyhe (DE); Thomas Vogel, Langwedel-Etelsen (DE)

(73) Assignee: Airbus Deutschland GmbH (DE)

( * ) Notice: Subject to any disclaimer, the term of this patent is extended or adjusted under 35 U.S.C. 154(b) by 471 days.

(21) Appl. No.: 11/361,202

(22) Filed: Feb. 24, 2006

(65) Prior Publication Data

US 2006/0186271 A1   Aug. 24, 2006

(30) Foreign Application Priority Data

Feb. 24, 2005   (DE) .................. 10 2005 008 443

(51) Int. Cl.
*B64C 1/22*   (2006.01)
(52) U.S. Cl. .................. 244/137.1; 244/118.1; 414/679
(58) Field of Classification Search .............. 244/118.1, 244/137.1; 198/370.09, 376, 395, 401, 437, 198/444, 572; 414/391, 392, 399, 498, 679
See application file for complete search history.

(56) References Cited

U.S. PATENT DOCUMENTS

| | | | | |
|---|---|---|---|---|
| 4,000,870 | A * | 1/1977 | Davies ..................... | 410/92 |
| 4,225,926 | A * | 9/1980 | Wendt ..................... | 701/124 |
| 5,101,962 | A * | 4/1992 | Pritchard ................. | 198/782 |
| 5,186,417 | A * | 2/1993 | Pritchard ................. | 244/137.1 |
| 5,267,709 | A * | 12/1993 | Koharcheck et al. ..... | 244/137.1 |
| 5,716,028 | A * | 2/1998 | Evans et al. .............. | 244/137.1 |
| 5,749,543 | A * | 5/1998 | Huber ..................... | 244/118.1 |
| 6,135,269 | A * | 10/2000 | Huber et al. ............. | 198/718 |
| 6,279,730 | B1 * | 8/2001 | Schreger et al. .......... | 198/722 |
| 6,311,106 | B1 * | 10/2001 | Dupont .................... | 701/3 |
| 6,328,154 | B1 | 12/2001 | Huber | |

(Continued)

FOREIGN PATENT DOCUMENTS

DE    41 36 972 A1    5/1993

(Continued)

OTHER PUBLICATIONS

German Office Action dated Apr. 7, 2008.

(Continued)

*Primary Examiner*—Michael R Mansen
*Assistant Examiner*—Brian M O'Hara
(74) *Attorney, Agent, or Firm*—Ostrolenk Faber LLP

(57) ABSTRACT

A loading device 1 for loading and unloading of a cargo hold having at least one conveying system for positioning cargo units in the area of a floor space of the cargo hold, and with at least one guiding element guiding the conveying, and a movement aid in the area of the floor space 11 of the cargo hold 5 enabling rotation and movement of the cargo unit. Sensors detect the presence of a cargo unit in the area of the conveying system without contact the position of a cargo unit on the floor space is determined in at least two spatial dimensions without contact. The sensors make it possible to control rotating movements of the cargo units in the area of the respective conveying systems by a controller.

10 Claims, 2 Drawing Sheets

U.S. PATENT DOCUMENTS

| | | | |
|---|---|---|---|
| 6,420,846 B1 * | 7/2002 | Wolfe | 318/463 |
| 6,517,028 B2 * | 2/2003 | Huber | 244/137.1 |
| 6,622,846 B1 * | 9/2003 | Dean | 198/370.09 |
| 6,659,704 B2 * | 12/2003 | Fukuhara et al. | 414/398 |
| 6,705,817 B2 * | 3/2004 | Wittenstein et al. | 414/373 |
| 6,871,823 B2 * | 3/2005 | Roberts | 244/137.1 |
| 7,199,543 B1 * | 4/2007 | Hettwer | 318/480 |

FOREIGN PATENT DOCUMENTS

| | | |
|---|---|---|
| DE | 100 02 957 A1 | 7/2001 |
| DE | 100 54 821 A1 | 5/2002 |
| DE | 103 38 704 A1 | 3/2005 |
| EP | 0 512 672 A1 | 11/1992 |
| EP | 1 275 579 A2 | 1/2003 |
| EP | 1 378 443 A1 | 1/2004 |
| EP | 1 415 908 A2 | 5/2004 |

OTHER PUBLICATIONS

Search report from the European Patent Office mailed Dec. 30, 2008, in EP Publication 1695908, 5 pages).

* cited by examiner

LOADING DEVICE FOR THE AT LEAST PARTIALLY AUTOMATED LOADING AND UNLOADING OF A CARGO HOLD ON TRANSPORT EQUIPMENT AS WELL AS A CONVEYING SYSTEM

This application claims the benefit of German Patent Application No. 10 2005 008 443.5 filed Feb. 24, 2005, the disclosure of which is hereby incorporated herein by reference.

FIELD OF THE INVENTION

The invention relates to a loading device for the at least partially automated loading and unloading of a cargo hold on transport equipment, in particular a cargo hold on an aircraft, with at least one conveying system for positioning cargo units in the area of a floor space of the cargo hold, and with at least one guiding element, as well as at least one movement aid in the area of the floor space of the cargo hold.

In addition, the invention relates to a conveying system, in particular for a loading device for the at least partially automated loading and unloading of a cargo hold of a transport equipment, in particular a cargo hold on an aircraft, with at least one conveying unit, in particular with at least one driven transport roller.

TECHNOLOGICAL BACKGROUND

Known embodiments of loading devices for aircraft for the partially automated loading and unloading of cargo units are integrated directly into the cargo hold or its floor space. Among other things, such loading devices have a plurality of conveying systems, guiding elements and movement aids, and are used for the at least partially automated loading and unloading of cargo holds with standardized cargo units with minimal personnel requirements.

The movement aids are designed as roller paths, ball mats of the like, for example, and reduce friction between the floor space and underside of the cargo units to facilitate a positioning of the cargo units on the floor space of the cargo hold.

On the one hand, the guiding elements are used to reliably guide the cargo units while the conveying systems position them. For example, the guiding elements prevent the cargo units from becoming jammed or wedged against each other or within the cargo space. On the other hand, the guiding elements act to reliably secure the individual cargo units after positioned in the cargo hold against unintended slippage during transport. The cargo units are fixed in place by additional securing elements arranged on the floor space of the cargo hold, e.g., detent pawls, erectable latching elements or the like. The guiding elements are essentially arranged parallel to the longitudinal axis of the aircraft in the cargo hold.

The cargo units have standardized dimensions, and are formed as pallets or containers, for example. The cargo units also have guiding units that are insertable into the guiding elements arranged in the area of the cargo hold. For example, so-called z-guides are laterally arranged on the cargo units, and are insertable into correspondingly designed grooves of the guiding elements arranged in the area of the cargo hold walls. The cargo units can hence be shifted only parallel to the longitudinal axis of the aircraft in the cargo hold in the area of the guiding elements. Movements by the cargo units in the direction transverse to the longitudinal axis of the aircraft are precluded above a tolerance range, thereby securing the cargo units against uncontrolled transverse movements. In addition, the z-guides additionally prevent the cargo units from "lifting" from the floor space of the cargo hold parallel to its vertical axis, which is important during turbulence or rapid descent, for example.

Among other things, the conveying systems of known loading and unloading devices have at least one motor-driven, and preferably anti-slip, transport roller. The anti-slip design of the transport rollers in the conveying systems improves the traction between the underside of the cargo units and/or the transport roller. The undersides of the cargo units rest on at least areas of the transport rollers of the conveying systems, so that the conveying systems can move the cargo units on the floor space in the cargo hold in one direction in space. An abutting cargo unit can here only move in one direction in space perpendicular to the rotational axis of the transport roller. In addition, the cargo units here move essentially parallel to the floor space of the cargo hold. A plurality of conveying systems are preferably spaced uniformly apart relative to each other over the floor spaces of the cargo hold. The (longitudinal) conveying directions for moving the cargo units in the direction of the longitudinal axis of the aircraft are here integrated into the floor space of the cargo hold in such a way that the rotational axes of the transport rollers of these conveying systems are aligned roughly transverse to the longitudinal axis of the aircraft. So that the cargo units can also be moved transverse to the longitudinal direction of the aircraft, additional conveying systems are integrated in the floor space turned by 90°, so that the rotational axes of the transport rollers of these (transverse) conveying systems are essentially aligned parallel to the longitudinal axis of the aircraft. The spatial distance between the conveying systems is here preferably selected in such a way that at least two respective conveying systems are in simultaneous contact with an underside of a cargo unit.

In addition, so-called "scrab" sensors and optical sensors are integrated into the conveying systems.

The optical sensor is used to detect a cargo unit resting in the area of the respective conveying system, so that only those conveying systems having a cargo unit laying thereon are actuated by an open and/or closed loop controllers. This optimizes the power consumption of the entire device. The optical sensor preferably operates without contact with a radiation source and radiation detected based on the principle of a reflective light barrier. The optical sensor can here operate in the entire electromagnetic spectrum.

A so-called "scrab" sensor detects the movement of an applied cargo unit in the respective transport direction of the conveying system in question. The mechanically acting "scrab" sensor essentially encompasses an impeller, which is linked with the transport roller via a sliding clutch. The impeller has a somewhat larger diameter than the diameter of the transport roller in the conveying system to ensure a reliable mechanical contact with an applied cargo unit. Permanent magnets are incorporated into the impeller for acquiring the movements of the impeller. A Hall sensor can be used to determine the rotational velocity of the impeller, and the rotational velocity can be evaluate via an open and/or closed loop controller. The rotational velocity of the impeller is equal to the rotational velocity of the transport roller with the conveying system in an unloaded state. However, if a cargo unit rests on the conveying system, due to the significantly higher frictional value between the impeller of the "scrab" sensor and the underside of the cargo unit the rotational velocity of the impeller, even with a sliding transport roller, is determined essentially based on the actual rate of advance of the cargo unit via the conveying system. As a result, the open and/or closed loop controller can detect and effectively control the movements of the cargo units in the cargo hold.

However, a "scrab" sensor can only determine the movement of a cargo unit in the direction in space perpendicular to the rotational axis of the transport roller of the involved conveying system.

Both the conveying systems and the movement aids are essentially integrated in the area of the floor space of the aircraft cargo hold to be loaded, while the guiding elements can also be arranged in the area of the cargo hold walls. The conveying systems and movement aids essentially are flush with the floor space of the cargo hold to form a continuous loading plane.

Due to the essentially purely mechanical operating mechanism, the "scrab" sensors are susceptible to failure and wear. In addition, the known "scrab" sensors can only acquire the speed of movement, acceleration or position of an applied cargo unit in the direction of a respective spatial dimension, e.g., in the direction of the longitudinal or transverse axis of the aircraft. However, the limited space conditions in the cargo holds of modern aircraft often make it necessary to additionally swivel the cargo units around their vertical axis, so that a sensor suitable for acquiring rotational movements must make it possible to simultaneously determine the movement and position of a cargo unit in both the direction of the longitudinal axis of the aircraft and transverse thereto. Further, it has been necessary to date that each conveying system be equipped both with an optical sensor for acquiring an applied cargo unit and an essentially mechanically operating "scrab" sensor, so that at least the direction of movement of a cargo unit can be determined perpendicular to the rotational axis of the transport roller of the conveying system, parallel to the floor space of the cargo hold.

SUMMARY OF INVENTION

There may be a need to avoid the above disadvantages to known embodiments of "scrab" sensors and optical sensors in conveying systems for at least semi-automatically operating loading systems in cargo holds of transportation equipment, in particular in the cargo holds of aircraft.

This need may be met with a loading device having the features of claim 1.

Because each conveying system may have at least one sensor, wherein the sensor or sensors may detect the presence of a cargo unit in the area of the conveying system without contact, and at least the position of a cargo unit on the floor space may be determined in at least two spatial dimensions without contact, operation of the conveying systems in the cargo hold of a transport equipment, in particular an aircraft may be wear-free and low-maintenance. In addition, each conveying system may need only exhibit one sensor, which simultaneously may assume the task of the "scrab" sensor and the previous optical sensors. In addition, the positions of the cargo units on the floor space of the cargo hold may be determined using the new type of sensors via the conveying system in at least two spatial dimensions, e.g., simultaneously in the x-direction and y-direction of the space. Therefore, the cargo units may be positioned on the floor space of the cargo hold as desired by the loading device according to the invention by suitably actuating the conveying systems with a an open and/or closed loop controller. The fact that there is only one sensor also reduces the probability of failure of the entire loading device.

In another exemplary embodiment of the invention, the sensor or sensors may be used to acquire the velocity of a cargo unit on the floor space of the cargo hold in at least two spatial dimensions without contact.

In addition to possibly acquiring the absolute position of the cargo unit in at least two spatial dimensions, this configuration may make it possible to determine the velocity of the cargo unit in at least two directions in space as additional information for more precisely controlling the sequence of movements of the cargo units on the floor space of the cargo hold.

In another exemplary embodiment of the invention, the sensor or sensors may be used to determine the acceleration of a cargo unit on the floor space of the cargo hold in at least two spatial dimensions without contact.

This configuration may make it possible to determine the acceleration of a cargo unit in at least two directions in space as additional control information.

Another exemplary embodiment of the invention provides that the sensor or sensors be comprised of and/or comprise contactless components, in particular with optoelectronic components.

This may enable a largely wear-free, and hence low-maintenance, operation of the conveying systems inside the loading device.

The additional claims describe other exemplary embodiments of the system.

Further, the need may be met by a conveying system according to claim 13.

According to one exemplary aspect of the invention a loading device for the at least partially automated loading and unloading of a cargo hold on transport equipment, in particular a cargo hold of an aircraft, is provided, which loading device comprises at least one conveying system for positioning cargo units in an area of a floor space of the cargo hold, at least one guiding element and at least one movement aid in the area of the floor space of the cargo hold. Each conveying system comprises at least one sensor, wherein the sensor or sensors are adapted in such a way that the presence of a cargo unit in an area of the conveying system is detectable without contact, and wherein the sensor or sensors are further adapted in such a way that at least the position of a cargo unit on the floor space is determinable in at least two spatial dimensions without contact.

Furthermore, according to one exemplary aspect a conveying system, in particular for a loading device according to an exemplary embodiment of the invention, is provides, which conveying system comprises at least one conveying unit, in particular with at least one driven transport roller and at least one sensor. The sensor or sensors are adapted in such a way that the presence of a cargo unit in an area of the conveying system is detectable without contact, wherein the sensor or sensors are further adapted in such a way that at least the position of a cargo unit on the floor space is determinable in at least two spatial dimensions without contact.

Because each conveying system may have at least one sensor, wherein the sensor or sensors may be used to detect the presence of a cargo unit in the area of the conveying system without contact, and at least the position of a cargo unit may be acquired on the floor space in at least two spatial dimensions without contact, the conveying system according to an embodiment of the invention integrated in the loading device for the at least partially automated loading and unloading of a cargo hold of transport equipment may be operated largely without wear and maintenance free. In addition, acquiring the position of a cargo unit on the floor space of the cargo hold in at least two spatial dimensions may make it possible to control complex sequences of movements by the cargo units on the floor space of the cargo hold. Further, the statistical probability of failure for the entire loading device may be decreased by the presence of only one sensor per conveying system.

DESCRIPTION OF PREFERRED EMBODIMENTS OF THE INVENTION

Figure 1:
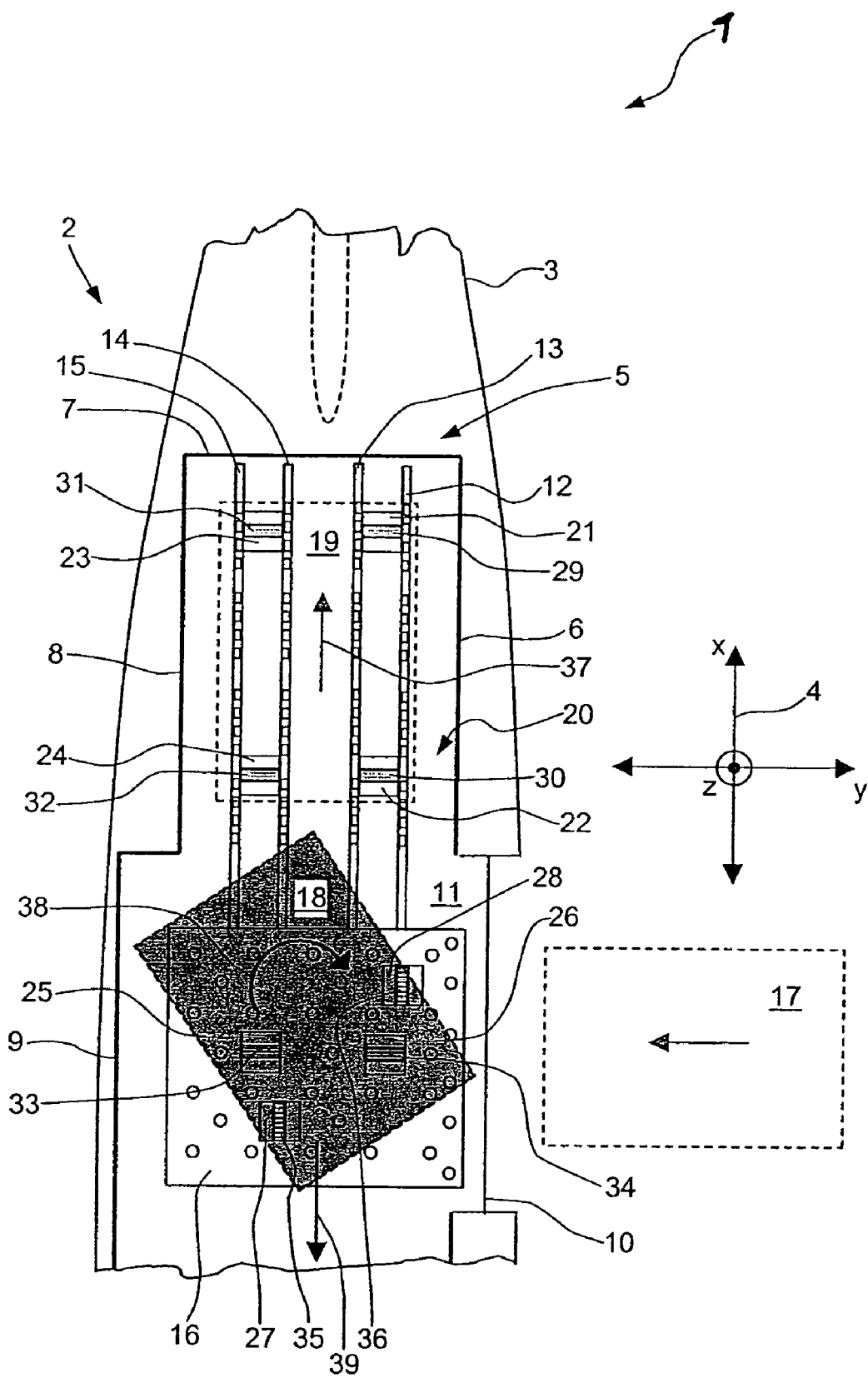
FIG. 1 A diagrammatic top view of the loading device according to an exemplary embodiment of the invention within a cargo hold arranged inside the tail section of an aircraft, and FIG. 2 A detailed top view of a conveying system as a component of the loading device according to an exemplary embodiment of the invention.

FIG. 1 shows a diagrammatic top view of the loading device according to an exemplary embodiment of the invention within a cargo hold arranged inside the tail section of an aircraft.

The loading device 1 according to the exemplary embodiment of the invention is integrated in the tail section 2 of an aircraft 3 in the exemplary embodiment shown. A rectangular coordinate system 4 is shown on FIG. 1 with an x, y and z-axis in order to illustrate the three directions in space. Cargo hold walls 6 to 9 envelop a cargo hold 5. A loading gate 10 is used to close the cargo hold 5 after loading and/or for unloading. A rear area of the floor space 11 of the cargo hold 5 accommodates the roller paths 12 to 15 as a movement aid. A ball mat 16 is situated in the area of the loading gate 10 as a movement aid. The ball mat 16 encompasses a plurality of balls arranged in a matrix as denoted on FIG. 1 by small circles, the surfaces of which project out of boreholes in the ball mat 16, at least in areas. The balls are accommodated easily rotatable in at least two directions in space in the ball mat 16. The roller paths 12 to 15 as well as the ball mat 16 facilitate the positioning of cargo units 17, 18, 19 on the floor space 11, in particular in the area of the loading gate 10.

The roller paths 12 to 15 here essentially allow the cargo units 17, 18, 19 to move in the x-direction, while the cargo units 17, 18, 19 can be shifted in both the x-direction and y-direction in the area of the ball mat. For example, the cargo units 17, 18, 19 can be turned in the area of the ball mat 16, as denoted by the pivoted position of the cargo unit 18 on FIG. 1. Configurations of the movement aids in the form of roller paths 12 to 15 and of the ball mat 16 that deviate from the illustration on FIG. 1 are also possible.

The roller paths 12 to 15 as well as the ball mat 16 are preferably integrated into the floor space 11 of the cargo hold 5 in such a way as to be roughly flush with one upper side 20 of the floor space 11, and allow traversal with the cargo units 17, 18, 19 with as little resistance as possible.

The cargo units 17, 18, 19 are designed as containers, pallets or the like, and preferably exhibit normal, standardized outer dimensions. The cargo units 17, 18, 19 are used for transporting goods of all types by aircraft 3.

In addition, guiding elements for guiding the cargo units 17, 18, 19 at least in areas during the loading or unloading process are arranged in the cargo hold 5 in the area of the floor space 11 and/or in the area of the cargo hold walls 6 to 9, but not depicted on FIG. 1 for purposes of better clarity.

The long sides of cargo units 17, 18, 19 comprise, for example, z-shaped guiding units (not shown on FIG. 1), at least sections of which can be incorporated into correspondingly designed grooves in the guiding elements. This makes it possible to freely position the cargo units 17, 18, 19 essentially only parallel to the x-axis, while preventing an undesired movement or slippage parallel to the y-axis, i.e., in the longitudinal direction of the aircraft, to within a narrow tolerance range. In addition, the z-shaped guiding units on the cargo units 17, 18, 19 prevent an undesired movement of the cargo units 17, 18, 19 in the direction of the z-axis, which could manifest itself as a "lifting" of the cargo units 17, 18, 19 from the floor space 11 during flight, in particular during turbulence, rapid descent or the like. In order to prevent the cargo units 17, 18, 19 from also shifting in the direction of the x-axis after the loading process, securing elements, e.g., detent pawls, erectable latching elements or the like, are arranged in the area of the upper side 20 of the floor space 11 (not shown in any greater detail). After completion of the loading process, the cargo units 17, 18, 19 are secured against unintended slippage in the x, y and z-direction.

The (longitudinal) conveying systems 21 and 22 are arranged between the roller paths 12 and 13 in the rear area of the cargo hold 5. The (longitudinal) conveying systems 23, 24 are correspondingly situated between the roller paths 14 and 15. In addition, the (longitudinal) conveying systems 25, 26 are arranged in the area of the loading gate 10 and/or ball mat 16. Further, the (transverse) conveying systems 27 and 28 are located in the area of the ball mat 16. The terminological differentiation between (longitudinal) and (transverse) conveying systems serves solely to help better describe the transport processes within the cargo hold 5. Both the (longitudinal) and (transverse) conveying systems have the same structural design, differing only in terms of their alignment or integration in the floor space 11 of the cargo room 5. The (longitudinal) conveying systems 21 to 26 essentially allow transport of the cargo units 17, 18, 19 in the direction of the x-axis, while the (transverse) conveying systems 27, 28 enable movement of the cargo units 17, 18, 19 in the y-direction orthogonal hereto. The conveying system 21 comprises a motor-driven transport roller 29 which is controllable via the open and/or closed loop controller. Correspondingly, the remaining conveying systems 22 to 28 comprise motorized transport rollers 30 to 36. Further, the conveying systems 21 to 28 each have a sensor according to an exemplary embodiment of the invention, which is not shown on FIG. 1 for purposes of better clarity. By using the sensors the open and/or closed loop controller can ascertain whether a cargo unit 17, 18, 19 is located in the area of a conveying system 21 to 28. In addition, the open and/or closed loop controller can also determine the exact position of the cargo units in the x and y-direction in relation to the floor space 11 of the cargo hold 5.

The conveying systems 21 to 26 are set up in the cargo hold 5 in such a way that the rotational axes of the allocated transport rollers 29 to 34 of the (longitudinal) conveying systems 21 to 26 run about parallel to the y-axis, while the rotational axes of the transport rollers 35, 36 of the (transverse) conveying systems 27, 28 run about parallel to the x-axis.

The cargo unit 19 has been positioned along the direction of the arrow 37 via the conveying systems 21, 23, e.g., in the rear section of the cargo hold 5. By contrast, the cargo unit 18 is still in the area of the loading gate 10 in the area of the ball mat 16, and can be turned in the direction of the rotating arrow 38 around a vertical axis parallel to the z-axis and/or freely positioned via the simultaneous actuation of the conveying systems 25, 26, 27, 28 via the open and/or closed loop controller (not shown in any greater detail). As a result, the cargo unit 18, regardless of its widthwise expansion, which exceeds a width of the cargo hold 5 in the transverse direction, can be positioned in the direction of the arrow 39 in a front section of the cargo hold (not shown in any greater detail on FIG. 1). In the fully loaded state, cargo units 17, 18, 19 are also positioned in the area of the ball mat 16 to make the most efficient possible use of the loading capacity of the cargo hold 5.

Finally, the cargo unit 17 is in a standby position on a feeding device for cargo units 17, 18, 19 (not shown in any greater detail), e.g., a scissor table or the like. The cargo unit 17 is moved in the direction of the black directional arrow on the supply unit in order to advance it into the area of the loading device 1 according to an exemplary embodiment of the invention inside the cargo hold 5.

Figure 2:
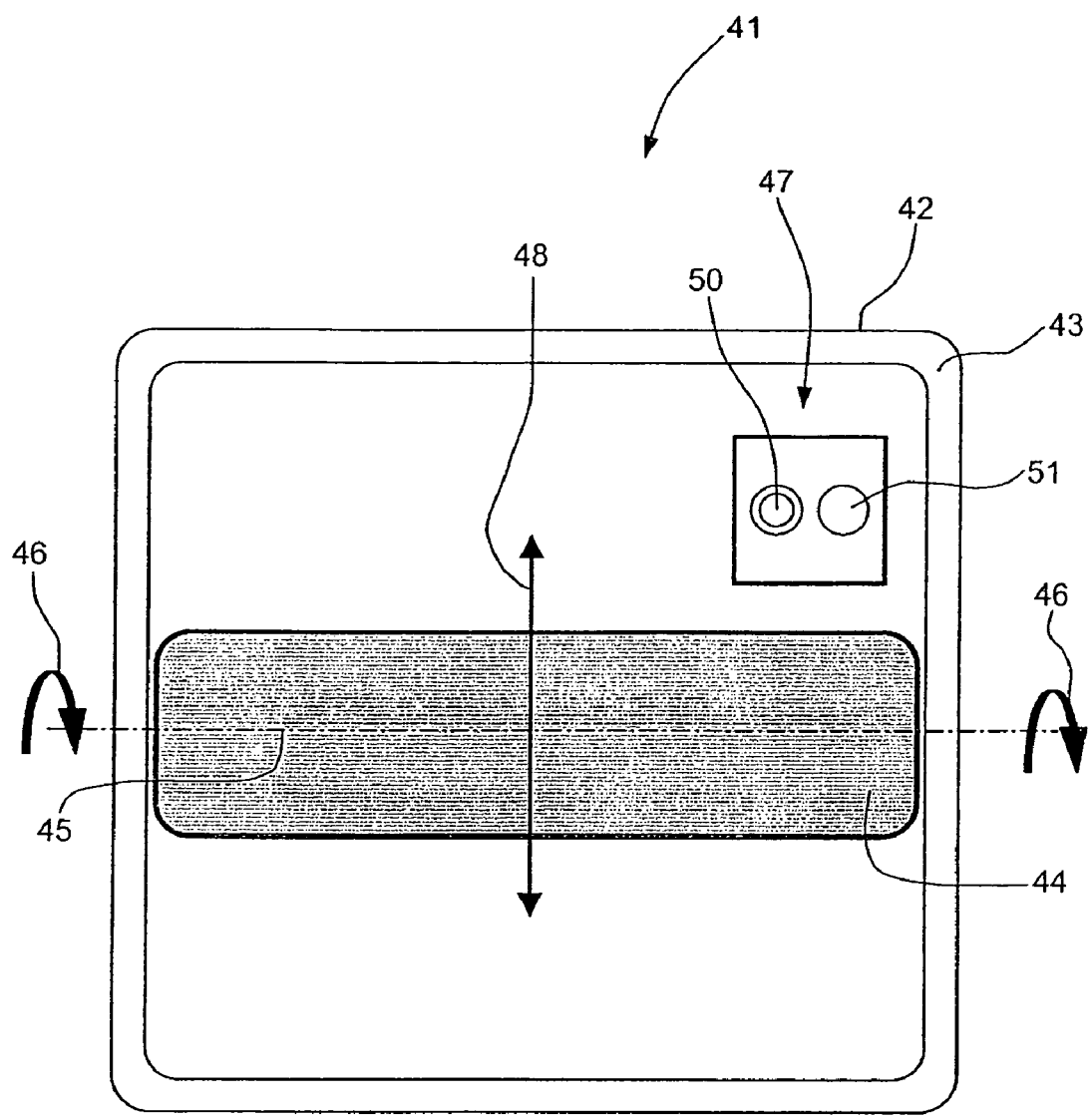

FIG. 2 shows a detailed top view of an exemplary embodiment for a conveying system for the loading device according to an exemplary embodiment of the invention for aircraft. A rectangular coordinate system 40 illustrates the three directions in space, represented by the x, y and z-axis.

Among other things, a conveying system 41 comprises a casing 42 with a continuous flange 43 for flush integration into a floor space of a cargo hold, a transport roller 44, which is accommodated in the casing in such a way that it can turn around a rotational axis 45 in the direction of the rotational arrows 46, as well as a sensor 47. The remaining conveying systems 21 to 28 also have such sensors (not shown in any greater detail) (compare FIG. 1).

By using the transport roller 44 which is preferably provided with an anti-slip coating, an applied cargo unit can be, essentially, positioned only in the direction of the double arrow 48, i.e., parallel to the x-axis of the coordinate system 40. Further, the transport roller 44 is powered by an electric drive unit (not shown in any greater detail).

In addition, the loading device 1 according to the exemplary of the invention has an open and/or closed loop controller 49.

The open and/or closed loop controller makes it possible to actuate the electrical drive units of all conveying systems 21 to 28 and 41 of the loading device 1 independently of each other. Further, a preferably electrical measuring signal of the sensor 47 of the conveying system 41 is supplied to the open and/or closed loop controller 49, which represents at least the positions of the transport units 17, 18, 19 in the x and y-direction relative to the floor space 11 of the cargo hold 5. The measuring signals of the sensors integrated into the remaining conveying systems 21 to 28 are also relayed to the open and/or closed loop controller 49, and there evaluated to actuate the electrical drives of the remaining conveying systems 21 to 28 and 41 during the process of loading or unloading the cargo hold 5 with the loading device 1 according to the exemplary embodiment of the invention.

In addition, a human operator can use actuators and controls (not shown in any greater detail) to also influence the open and/or closed loop controller 49, thereby completely manually controlling the generally at least partially automated process of loading or unloading the cargo hold 5 with the cargo units 17, 18, 19.

The sensor or sensors 47 preferably comprises/comprise at least one light-emitting diode 50 with a high radiation intensity as the radiation source, and at least one photodiode 51 as the radiation detector. Instead of one or more photodiodes 51, the sensor 47 can also exhibit one or more phototransistors as the radiation detector. The light-emitting diode 50 and photodiode 51 preferably use infrared radiation to suppress interference, disturbance and/or noise caused by scattered light and reflected glare in the visible range. Laser diodes or the like can also be used in place of one or several light-emitting diodes or one or more infrared diodes.

To further improve interference immunity, the radiation emitted by the light-emitting diode 50 can also be modulated. In this case, an amplifier is preferably hooked up downstream to the photodiode 51 to selectively amplify the modulated radiation.

The sensor 47 can alternatively work in the range of visible light, e.g., in the type of known position detectors for optical pointing devices for graphic user interfaces in electronic data processing ("so-called optical mouses"). As opposed to the previously known position detectors in pointing devices for graphic user interfaces in electronic data processing, the position detectors or the sensor(s) 47 are not moved over the floor space 11 of the cargo hold 5 in the loading device 1 according to the exemplary embodiment of the invention, but rather a "sub-floor" in the form of the undersides of the cargo units 17, 18, 19 is passed over the sensor 47 or sensors of the conveying systems 21 to 28 as well as 41 as a kind of "optical trackball".

The sensors 47 can be used on the one hand to determine the presence of a cargo unit 17, 18, 19 in the area of the respective conveying system 21 to 28 as well as 41. For example, if a cargo unit 17, 18, 19 is located in the area of the conveying system 41, a large percentage of the radiation emitted by the light-emitting diode 50 is reflected back from an underside of the applied cargo unit 17, 18, 19, so that the photodiode 51 catches a portion of this reflected radiation, and relays this "occupied signal" to the open and/or closed loop controller 49. In this case, the electrical drive unit of the transport roller 44 is actuated under the control of the open and/or closed loop controller 49. By contrast, if no cargo unit is located in the area of the conveying system 41, the radiation emitted by the light-emitting diode 50 is not reflected, the light-emitting diode 50 issues no "occupied signal" for lack of sufficient illumination, and the electrical drive unit of the respective transport roller 44 remains deactivated. Because only those conveying systems 21 to 28 as well as 41 having a cargo unit 17, 18, 19 laying upon in their vicinity are actuated by the open and/or closed loop control system results in a major savings in electrical energy.

On the other hand, the movement or position of a cargo unit 17, 18, 19 can be acquired without contact above the conveying systems 21 to 28 as well as 41 by the sensor 47 or sensors in the direction of the x and y-axis relative to the floor space 11 of the cargo hold 5. As an alternative, the sensor 47 or remaining sensors can also detect a movement or position of the cargo units 17, 18, 19 in the z-direction.

The respective positions of the cargo units 17, 18, 19 are here detected via the sensors 47 or remaining sensors (not shown here in any greater detail) in the x and y-direction in a manner consistent with known position detectors in optical pointing devices for graphic user interfaces in electronic data processing ("so-called optical mouses").

Determining when a cargo unit 17, 18, 19 has been removed from the floor space 11 of the cargo hold 5 in the z-direction of the coordinate system 40 can be done via runtime measurements or by determining the reflecting angles of the radiation issued by the light-emitting diode 50 and reflected by the undersides of the cargo units 17, 18, 19, which can be trapped by the photodiode 51 and correspondingly evaluated. The radiation caught by the photodiode 51 is evaluated by complex mathematical algorithms. To this end, the sensors themselves can be equipped with powerful computers that correspondingly preprocess the measuring signals independently of the open and/or closed loop controller.

The loading device 1 according to the exemplary embodiment of the invention has a plurality of conveying systems 21 to 28 as well as 41, which each are equipped with contactless optical sensors based on the sensor 47, which make it possible to determine the position of the cargo units 17, 18, 19 at least simultaneously in the x and y-direction relative to the floor space 11 of the cargo hold 5 in the form of a measuring signal. The measuring signals of the sensors, including the sensor 47, here represent the positions of the cargo units 17, 18, 19 at least in the direction of the x and y-axis relative to the floor space 11 of the cargo hold 5. This significantly facilitates in particular a controlled rotation, e.g., as denoted by the rotating arrow 38 on FIG. 1, of the cargo units 17, 18, 19 around a vertical axis parallel to the z-axis in the area of the ball mat 16, which is becoming increasingly important given the constraints on space in the cargo hold 5.

The measuring signals for the positions of the cargo units 17, 18, 19 in the x and y-direction determined by the individual sensors are relayed to the open and/or closed loop controller 49 for controlling and monitoring the entire loading and unloading process, which open and/or closed loop controller individually actuates the electrical drive units of the conveying systems 21 to 28 as well as 41 following evaluation of the measuring signals based on the positioning of the cargo units 17, 18, 19 on the floor space 11 of the cargo hold 5. To further optimize the entire loading and unloading process, the sensors can also be used to determine speed and acceleration values for the individual cargo units 17, 18, 19. In addition, the sensors can also be used, if required, to also determine at least the positions of the cargo units 17, 18, 19 in the z-direction relative to the floor space 11. Suitably actuating the conveying systems 21 to 28 as well as 41 makes it possible not just to position the cargo units 17, 18, 19 along the x- and parallel to the y-axis on the floor space 11. Rather, simultaneously actuating the (longitudinal) and (transverse) conveying systems 21 to 28 as well as 41 enables the realization of nearly any movement paths on the floor space 11 of the cargo hold 5, to the extent permitted by the guiding elements.

The contactless optical operation of the sensors here allows very interference-resistant, largely maintenance free and at least partially automated operation of the loading device 1 according to the exemplary embodiment of the invention, which is possible with minimal personnel.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

What is claimed is:

1. A loading device for the at least partially automated loading and unloading of cargo units in a cargo hold comprising a floor space of a transport equipment, the loading device comprising:
   a first conveying system for positioning a cargo unit in a longitudinal direction of the floor space of the cargo hold and a second conveying system for positioning the cargo unit on the floor space in a second direction transverse to the longitudinal direction, each conveying system comprising a housing and at least one sensor arranged in the housing;
   at least one guiding element for guiding conveyance of a cargo unit by the first conveying system and the second conveying system;
   at least one movement aid for enabling positioning of the cargo unit, the movement aid being located in the floor space of the cargo hold;
   the loading device is formed and operable so as at least partially to turn the cargo unit around a vertical axis of the cargo unit;
   the at least one sensor operates to detect a presence of the cargo unit in an area of the conveying system without contact between the at least one sensor and the cargo unit;
   the at least one sensor is further operable to determine and acquire as measurement data, a position and a velocity of the cargo unit on the floor space in at least two spatial dimensions without contact between the at least one sensor and the cargo unit; and
   a controller for the conveying system, the controller operable to receive the measurement data from the at least one sensor and to actuate independently one or both of the first conveying system and the second conveying system according to the measurement data to move the cargo unit.

2. The loading device according to claim 1, wherein the at least one sensor comprises at least one radiation source that emits measuring radiation.

3. The loading device according to claim 2, wherein the radiation source is operable to modulate measuring radiation emitted by the radiation source so as to suppress interference.

4. The loading device according to claim 2, wherein the at least one sensor comprises a radiation detector for evaluating measuring radiation reflected from an underside of the cargo unit.

5. The loading device according to claim 4, wherein the position of a cargo unit on the floor space of the cargo hold is determined from the measuring radiation reflected from the underside of the cargo unit.

6. The loading device according to claim 1, wherein each of the first conveying system and the second conveying system comprises at least one conveying unit.

7. The loading device according to claim 6, wherein the conveying unit comprises at least one driven and anti-slip transport roller.

8. The loading device according to claim 1, wherein the movement aids comprise ball mats to facilitate the movement of cargo units on the floor surface of the cargo hold.

9. The loading device according to claim 1, wherein the at least one guiding element is configured to receive insertable guiding units positioned on the cargo units so as to guide the cargo units at least sectionally during positioning on the floor space of the cargo hold and to secure the cargo units against slippage after positioning.

10. The loading device according to claim 1, wherein the at least one sensor comprises a radiation detector for evaluating measuring radiation reflected from an underside of the cargo unit.

* * * * *

UNITED STATES PATENT AND TRADEMARK OFFICE
CERTIFICATE OF CORRECTION

PATENT NO. : 7,604,204 B2  
APPLICATION NO. : 11/361202  
DATED : October 20, 2009  
INVENTOR(S) : Jacobsen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 536 days.

Signed and Sealed this

Fifth Day of October, 2010

David J. Kappos  
*Director of the United States Patent and Trademark Office*